United States Patent
Zheng et al.

(10) Patent No.: US 7,406,066 B2
(45) Date of Patent: Jul. 29, 2008

(54) ASYNCHRONOUS MODULATION AND DEMODULATION FOR SPREAD SPECTRUM AND CODE-DIVISION MULTIPLE ACCESS COMMUNICATION

(76) Inventors: Yi Zheng, 1605 Grizzly La., Sartell, MN (US) 56377; Aiping Yao, 2725 Edward Dr., St. Cloud, MN (US) 56301

( * ) Notice: Subject to any disclaimer, the term of this patent is extended or adjusted under 35 U.S.C. 154(b) by 847 days.

(21) Appl. No.: 10/684,150

(22) Filed: Oct. 9, 2003

(65) Prior Publication Data
US 2004/0120275 A1  Jun. 24, 2004

Related U.S. Application Data

(60) Provisional application No. 60/417,513, filed on Oct. 9, 2002.

(51) Int. Cl.
*H04B 7/216* (2006.01)
(52) U.S. Cl. .................. 370/335; 370/441; 370/463; 375/146; 375/147; 375/346
(58) Field of Classification Search ............. 370/328, 370/329, 335, 342, 441, 463, 535; 375/147, 375/140, 146, 346
See application file for complete search history.

(56) References Cited

U.S. PATENT DOCUMENTS
5,692,006 A * 11/1997 Ross ........................ 375/147
* cited by examiner

*Primary Examiner*—John Pezzlo

(57) ABSTRACT

The present invention of the modulation and demondulation removes the carry synchronization requirement for spread spectrum systems and code-division multiple access communication systems. The invention uses the PN codes that are specially selected and asynchronous demodulation procedure. If number of transmitters is limited, the Multiple Access Interference (MAI) due to carry differences of transmitters can be completely cancelled. Using this invention, signal from a desired transmitter can be demodulated and detected from received signals included from other transmitters in multiple access applications, even when the frequencies of transmitters are different from each other and are not synchronized with a receiver. The invention greatly reduces complexities of a wireless system where Code Division Multiple Access (CDMA) or spread spectrum is used. It expands applications of wireless communication. One of the applications is for a CDMA communication for multiple users without a centralized base station.

15 Claims, 5 Drawing Sheets

ASYNCHRONOUS MODULATION AND DEMODULATION FOR SPREAD SPECTRUM AND CODE-DIVISION MULTIPLE ACCESS COMMUNICATION

CROSS-REFERENCE TO RELATED APPLICATIONS

This application claims the benefit of Provisional Patent Application No. 60/417,513, filed Oct. 9, 2002.

FIELD OF THE INVENTION

This invention relates to modulator and demodulator design and carry synchronization in spread spectrum and code division multiple access (CDMA) communication systems. It also relates to applications of the spread spectrum and CDMA communication systems.

REFERENCES

U.S. Patent Documents

| 4,901,307 | February 1990 | Gilhousen, et al. | 370/320 |
|---|---|---|---|
| 6,621,850 | September 2003 | Li et al. | 375/130 |

SUMMARY OF THE INVENTION

The present invention provides a method for modulation and coding of spread spectrum and code-division multiple access communication systems. The invention removes the carry synchronization requirement of these communication systems. It benefits many communication systems inlcuding spread spectrum and code-division for multiple access applications. It makes that is possible to establish a carry asynchronous CDMA communication network without a centralized base station.

In the transmitter, spread signal or coded signal by an orthogonal code or a PN code will be further coded before the RF modulation so that the demodulation can be performed without a carry synchronous detector at a receiver. Assuming the baseband pulse is p(t) that represents one chip. Data 1s will be coded as p(t) or −p(t), alternatively. Data 0s will be coded as zero voltage level. At the receiver, a square law detector will be used to remove the RF carrier and preserver information to differentiate zeros and ones. All pulses representing ones become positive after the square law detector. Then a polar PN code is applied to extract the desired user and minimize the multi-access interference from other users. If PN codes are selected and the differences between carry frequencies are small, the multi-access interference will be small. If the number of received users is small, all multi-access interference can be cancelled using an interference cancellation algorithm of this invention.

DETAILED DESCRIPTION OF SPECIFIC EMBODIMENTS

Figure 1:
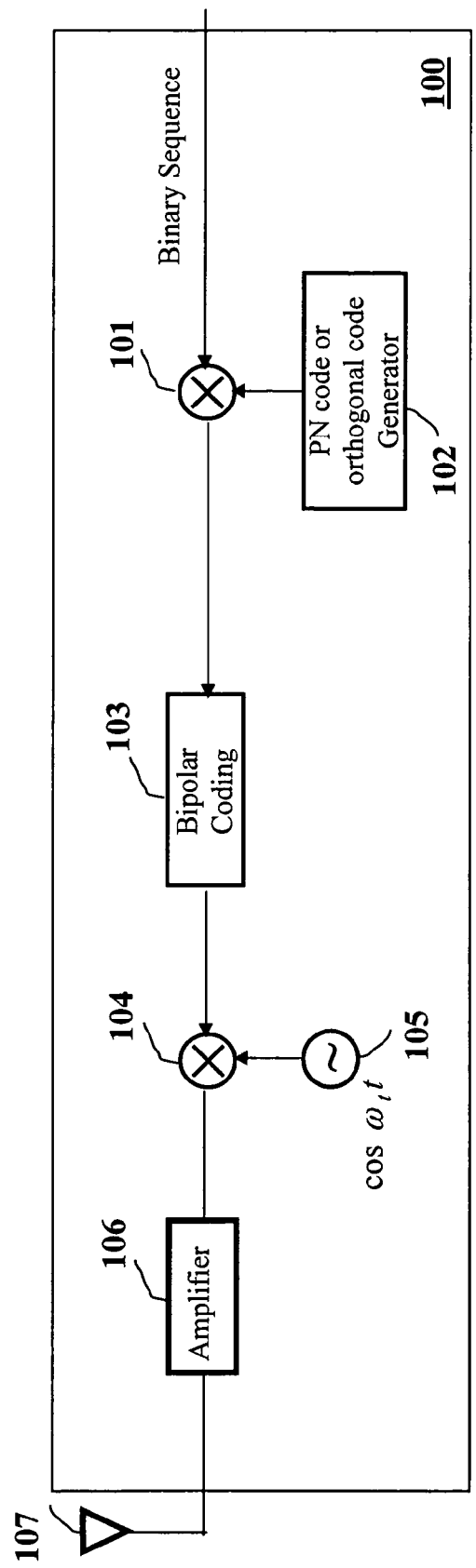
FIG. 1 is a simplified block diagram to show the basic principle of a transmitter for asynchronous carry modulation of spread spectrum and code-division multiple access communication systems, according to a disclosed embodiment of the present invention.

FIG. 1 is a simplified block diagram of a transmitter for asynchronous carry modulation of spread spectrum and code-division multiple access communication systems. As shown in FIG. 1, the transmitter 100 includes a spreading coder 101, PN or orthogonal code generator 102, bipolar coding 103, a carrier modulator 104, and local oscillator 105, amplifier 106, and an antenna or a cable interface 107.

Figure 2:
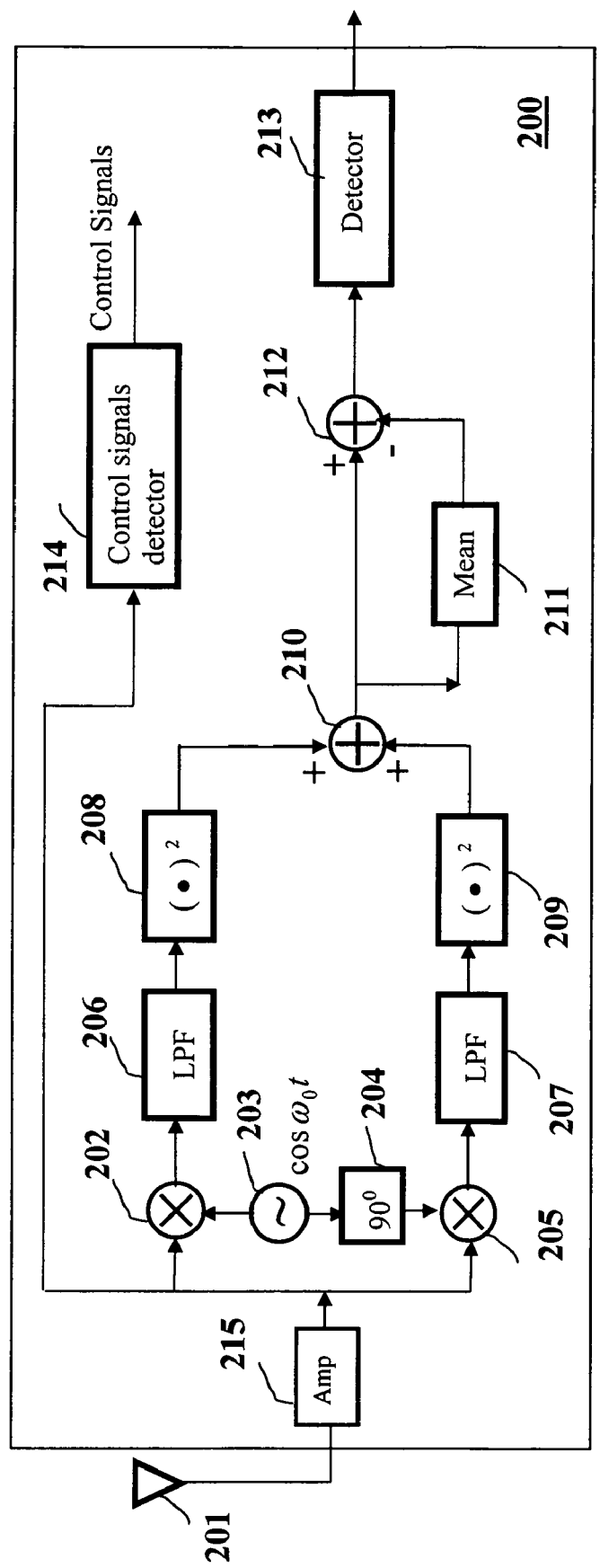
FIG. 2 is a simplified block diagram to show the basic principle of a receiver for asynchronous carry demodulation using a quadrature demodulator for spread spectrum and code-division multiple access communication systems, according to a disclosed embodiment of the present invention.

FIG. 2 is a simplified block diagram of a receiver for asynchronous demodulation using a quadrature demodulator for spread spectrum and code-division multiple access communication systems, according to a disclosed embodiment of the present invention. The receiver 200 consists of an antenna or a cable interface 201, a amplifier 215, quadrature mixers 202, 203, 204, and 205, lowpass filters 206 and 207, squarers 208 and 209, an adder 210, a subtractor 211, and a mean estimator 212, a detector 213, and a control channel signal detector 214. The detector 212 includes PN despreading or orthogonal code decoding, symbol synchronization, and optimal detector for information sequence.

Referring to FIG. 1 and FIG. 2, the principles of the transmitter and the receiver for asynchronous carry can be explained below with N independent transmitters and M receivers. Signal from the $i^{th}$ transmitter, having a configuration of 100, is:

$$s_i(t) = A_i f(u_i(t)) \cos(\omega_i t + \theta_i) \quad (1)$$

where $\omega_i$ is a transmitting frequency of $i^{th}$ user, $\theta_i$ is a phase of $i^{th}$ transmitter, $u_i(t) = I_i(t) * c_i(t)$ for the $i^{th}$ transmitter, which is done by 101 in FIG. 1.

$c_i(t)$ is a pseudonoise code (PN) (or a orthogonal code) sequence for the $i^{th}$ user. It consists of polar pulses (p(t) and −p(t) represent binary 1 and binary 0, respectively). It is generated by 102 in FIG. 1.

$I_i(t)$ is polar symbol sequence of the $i^{th}$ user. It may include information, source coding, channel coding, interleaving, symbol synchronization pilot information, and other control codes.

$A_i$ is amplitude of the $i^{th}$ signal.

$f(u_i(t))$ is a bipolar (pseudoternary) coding procedure: ones of $u_i(t)$ will be alternatively coded as p(t) or −p(t), and minus ones (binary zero) of $u_i(t)$ will be coded as 0. It is done by 103 in FIG. 1.

The coded signal $f(u_i(t))$ is modulated at a transmitting frequency of $\omega_i$ for transmission.

Received signal at 200 includes signals from N transmitters:

$$S_r(t)=2\rho_1 A_1 f(u_1(t))\cos(\omega_1 t+\theta_1(t))+ \ldots +2\rho_N A_N f(u_N(t))\cos(\omega_N t+\theta_N(t)) \quad (2)$$

where $2\rho_i$ represents an attenuation factor and $\theta_i(t)$ is a phase of received signal from the $i^{th}$ transmitter. At the output of quadrature mixer 202:

$$S'_I(t)=S_r(t)*\cos\omega_0 t \quad (3)$$

Apply lowpass filter 206, $$S_I(t)=\rho_1 f(u_1(t))\cos\Delta\omega_1 t+\rho_2 f(u_2(t))\cos\Delta\omega_2 t+\ldots+\rho_N f(u_N(t))\cos\Delta\omega_N t \quad (4)$$

where $\Delta\omega_1=\omega_0-\omega_1$, $\Delta\omega_2=\omega_0-\omega_2$, etc.

Similarly, at the output 205, $$S'_Q(t)=S_r(t)*\sin\omega_0 t \quad (5)$$

At the output of lowpass filter 207, $$S_Q(t)=\rho_1 f(u_1(t))\sin\Delta\omega_1 t+\rho_2 f(u_2(t))\sin\Delta\omega_2 t+\ldots+\rho_N f(u_N(t))\sin\Delta\omega_N t \quad (6)$$

Taking square of both I and Q signals by 208 and 209, $$S_I^2(t) = \rho_1^2 f^2(u_1(t))\cos^2\Delta\omega_1 t + \rho_2^2 f^2(u_2(t))\cos^2\Delta\omega_2 t + \\ 2\rho_1\rho_2 f(u_1(t))f(u_2(t))\cos\Delta\omega_1 t\cos\Delta\omega_2 t + \ldots + \\ 2\rho_{N-1}\rho_N f(u_{N-1}(t))f(u_N(t))\cos\Delta\omega_{N-1} t\cos\Delta\omega_N t \quad (7)$$

$$S_Q^2(t) = \rho_1^2 f^2(u_1(t))\sin^2\Delta\omega_1 t + \rho_2^2 f^2(u_2(t))\sin^2\Delta\omega_2 t + \\ 2\rho_1\rho_2 f(u_1(t))f(u_2(t))\sin\Delta\omega_1 t\sin\Delta\omega_2 t + \ldots + \\ 2\rho_{N-1}\rho_N f(u_{N-1}(t))f(u_N(t))\sin\Delta\omega_{n-1} t\sin\Delta\omega_N t \quad (8)$$

The output of the summer 210 is:

$$r(t) = S_I^2(t) + S_Q^2(t) = \rho_1^2 f^2(u_1(t)) + \rho_2^2 f^2(u_2(t)) + \\ 2\rho_1\rho_2 f(u_1(t))f(u_2(t))\cos(\omega_1 - \omega_2)t + \ldots + \rho_N^2 f^2(u_N(t)) + \\ 2\rho_{N-1}\rho_N f(u_{N-1}(t))f(u_N(t))\cos(\omega_{N-1} - \omega_N)t \quad (9)$$

The square operation converts the bipolar (pseudoternary) signals to on-off signals for all squared terms. If the information symbol $I_i$ from $i^{th}$ transmitter is 1, positive pulses of this on-off signal represent binary 1s and zero-levels represent binary 0s. If the information symbol $I_i$ is −1, positive pulses of this on-off signal represent binary 0s and zero-levels represent binary 1s.

The on-off signals represented by the squared terms is converted to polar signals using a mean estimator 211 and a subtractor 212:

$$s_p(t)=r(t)-\text{mean}(r(t)) \quad (10)$$

The dispreading can be directly applied to the summed signal denoted by (9) without removing the mean. However, the SNR increases by 3 dB if 211 and 212 are used.

The detection for $i^{th}$ user is done by detector 213. The detector 213 includes symbol synchronization, dispreading, and optimal detection. The dispreading is done by:

$$y(t)=\int_0^{T_b} c_i(t)s_p(t)dt \quad (11)$$

where $T_b$ is a symbol period of $I_i$. The integration for all squared term in (9) will be zero except $i^{th}$ squared term. The integration of $i^{th}$ square term:

$$E_i=\rho_i^2 \int_0^{T_b} c_i(t)(f^2(u_i(t))-\text{mean}(f^2(u_i(t))))dt=\rho_i^2\int_0^{T_b} c_i(t)u_i(t)dt=\pm\rho_i^2 NE_p \quad (12)$$

where $E_p$ is the energy of pulse p(t) for each chip and $(f^2(u_i(t))-\text{mean}(f^2(u_i(t))))$ is recovered polar signal $u_i(t)$. The sign of the integration depends on value of information symbol $I_i$: positive for 1 and negative for −1.

The integration of the dispreading for the cross terms $f(u_K(t))f(u_L(t))$ needs to be as small as possible. The integration for all cross terms is:

$$E_{MAI} = \sum_{K=1}^{N-1}\sum_{L=K+1}^{N}\int_0^{T_b} 2\rho_K\rho_L c_i f(u_K(t))f(u_L(t))\cos((\omega_K-\omega_L)t)dt \quad (13)$$

where $E_{MAI}$ represents mutli-access interference (MAI) from other transmitters when signal of the $i^{th}$ transmitter is to be detected. K have values from 1 to N−1 and L have values from K+1 to N. The cross term of $f(u_K(t))f(u_L(t))$ has a random sequence of 1, −1, and 0. The $c_K(t)$ and $c_L(t)$ should be selected so that the cross term $f(u_K(t))f(u_L(t))$ will not produce a sequence pattern that matches $c_i(t)$. If the carry frequency difference between two users are small comparing to the information data rate $1/T_b$, the integrations in (13) will be very small and different integration terms also tends to cancel each other. In this case, $E_{MAI}$ is small comparing with to $E_i$. Therefore, the multi-access interferences will be effectively removed by the dispreading. Above analysis is also valid for the uplink of cellular telephone applications.

In the case of a downlink for cellular telephone applications, the signals of users are from the same base station, transmitting frequencies will be the same for all users and the integrations of the cross terms will be zero, if $c_K(t)$ and $c_L(t)$ are selected so that the cross term $f(u_K(t))f(u_L(t))$ will not produce a sequence pattern that matches $c_i(t)$.

Figure 3:
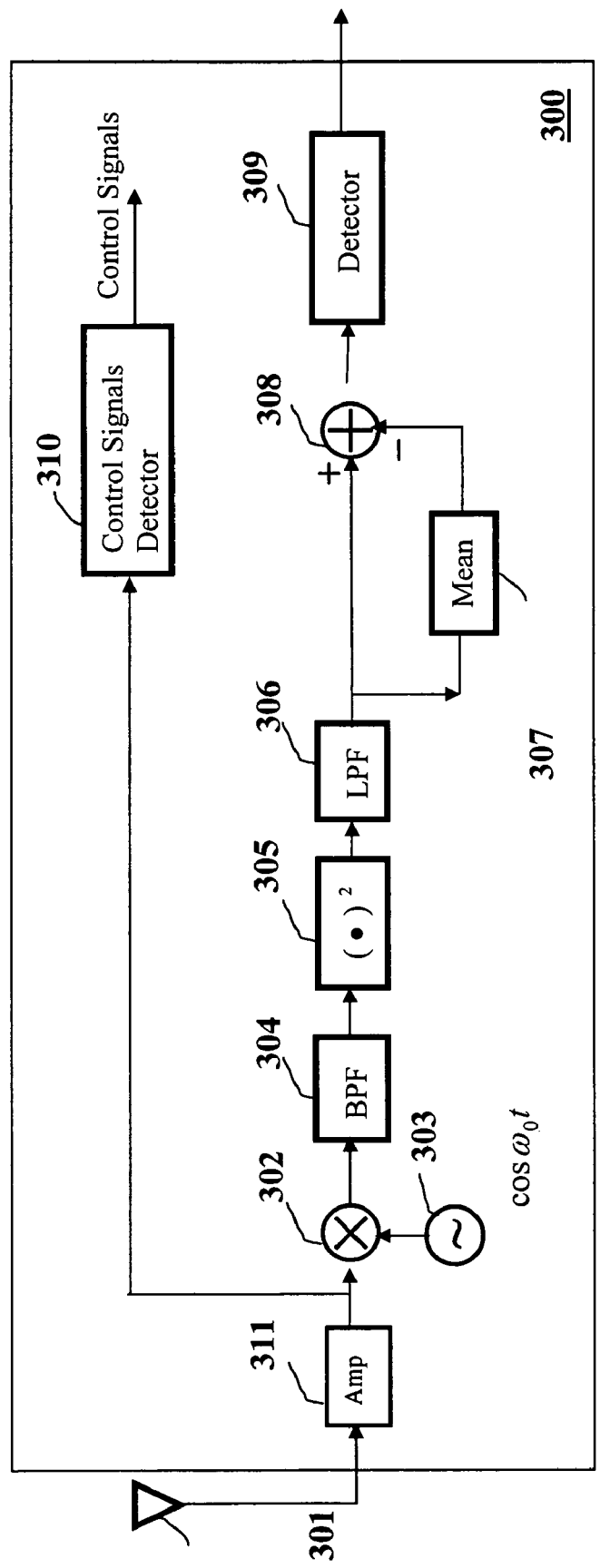
FIG. 3 is a simplified block diagram to show the basic principle of a receiver for asynchronous carry demodulation using an IF demodulator for spread spectrum and code-division multiple access communication systems, according to a disclosed embodiment of the present invention.

The above results of asynchronous demodulation can also be obtained using an IF demodulator as shown in FIG. 3. The receiver 300 consists of an antenna or a cable interface 301, an amplifier 311, IF mixer 302 and 303, a bandpass filter 304 for extracting IF signal, squarers 305, a lowpass filter 306, a subtractor 307, and a mean estimator 308, a detector 309, and a control channel signal detector 310. The detector 309 includes PN despreading or orthogonal code decoding, symbol synchronization, and optimal detector for information sequence. The bandpass filter 304 preserves only the IF frequency components, which is squared by the 305. Using the trigonometry identity for $\cos^2((\omega_i-\omega_j)t)$ and using LPF 306 to remove $\cos(2(\omega_i-\omega_j)t)$ terms of $S_1^2(t)$, we have output of the LPF 306:

$$r(t) = \rho_1^2 f^2( \quad (14) \\ u_1(t) + \rho_2^2 f^2(u_2(t)) + 2\rho_1\rho_2 f(u_1(t))f(u_2(t))\cos(\omega_1-\omega_2)t + \ldots + \\ \rho_N^2 f^2(u_N(t)) + 2\rho_{N-1}\rho_N f(u_{N-1}(t))f(u_N(t))\cos(\omega_{N-1}-\omega_N)t)$$

It is the same as equation (9). Then, the rest of the approach is the same as that from equations (10) to (13).

Figure 4:
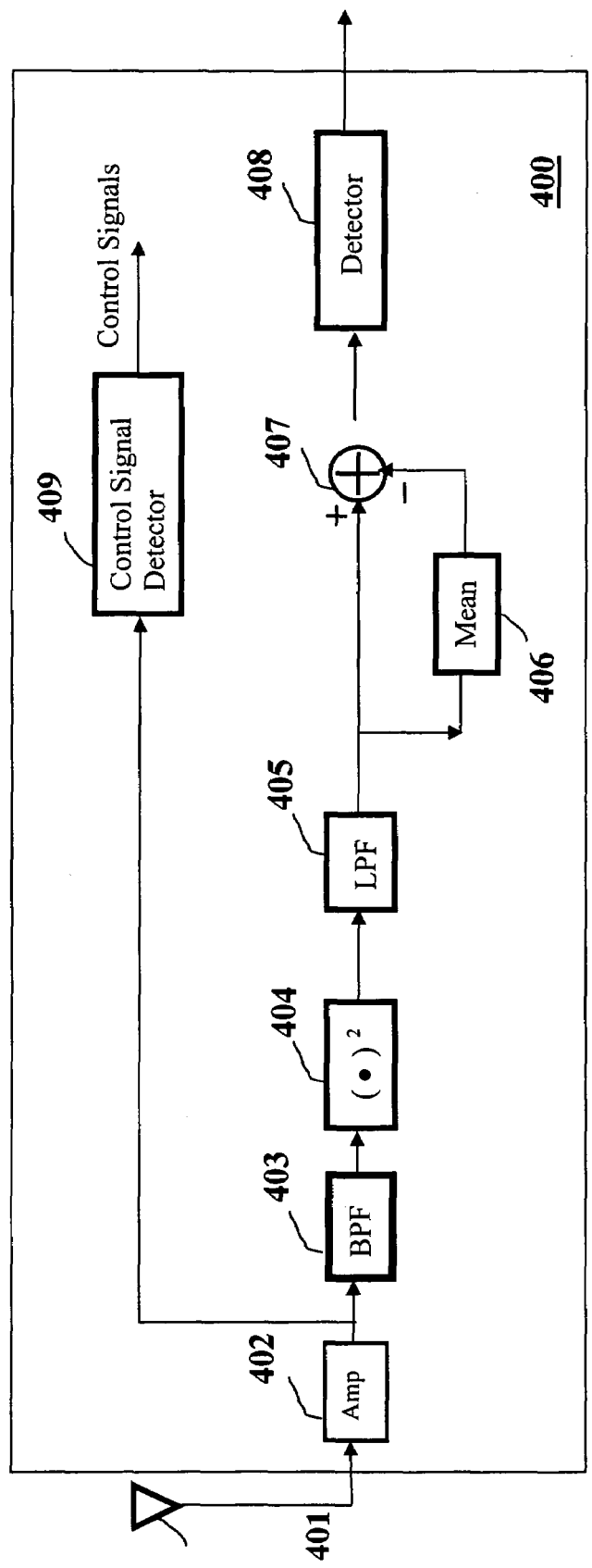
FIG. 4 is a simplified block diagram to show the basic principle of a receiver for asynchronous carry demodulation using a square law detector for spread spectrum and code-division multiple access communication systems, according to a disclosed embodiment of the present invention.
Figure 5:
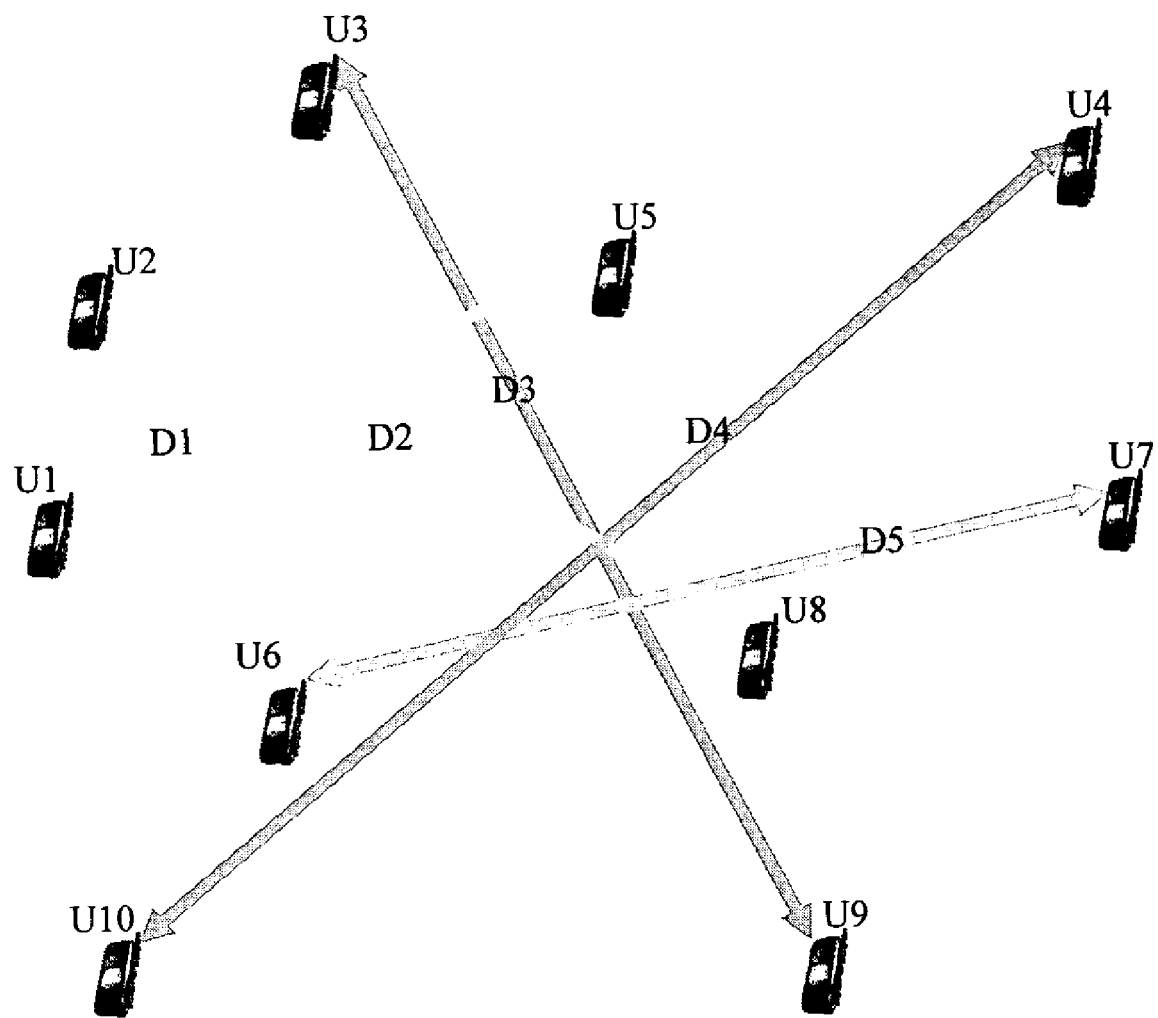
FIG. 5. shows direct communication links between cellar phones using asynchronous detector. Any two cellular phones can directly communicate each other with a secured CDMA link.

The above results of asynchronous demodulation can also be obtained using a square law detector as shown in FIG. 4. The receiver 400 consists of an antenna or a cable interface

401, a BPF 402, squarers 403, a lowpass filter 404, a subtractor 405, and a mean estimator 406, a detector 407, and a control channel signal detector 408. The detector 406 includes PN despreading or orthogonal code decoding, symbol synchronization, and optimal detector for information sequence. The output of the square is the same as (7) except $\omega_0=0$. Using the trigonometry identity for $\cos^2(\omega_i)$) and using a LPF 404 to remove $\cos(2\omega_i t)$ terms of $S_1^2(t)$, we have the output of the lowpass filter 404:

$$r(t) = \rho_1^2 f^2 ( \quad (15)$$
$$u_1(t) + \rho_2^2 f^2(u_2(t)) + 2\rho_1\rho_2 f(u_1(t))f(u_2(t))\cos(\omega_1 - \omega_2)t + \ldots +$$
$$\rho_N^2 f^2(u_N(t)) + 2\rho_{N-1}\rho_N f(u_{N-1}(t))f(u_N(t))\cos(\omega_{N-1} - \omega_N)t$$

which is the same as equation (9). Then, the rest of the approach is the same as that from equations (10) to (13).

This invention, therefore, simplifies the carrier synchronization requirement for multiple access CDMA or spread spectrum communication systems.

The technique also expands CDMA and Spread spectrum applications because the carry synchronization is not required. An example of such expanded applications of this invention includes direct links between cellular phones as shown in FIG. 4. U1 to U10 are mobile units including transmitter and receivers. D1 to D5 represent direct CDMA communication links between each pair of mobile units. Because the carry synchronization requirement is removed, the basestation is not required to synchronize the carry of mobile units so the direct links between each pair of mobile units are possible.

The invention can be further improved if number of mobile units is limited. If the number of users is less than L, where $K=2^L-1$ is a length of a PN code, integrations of all cosine terms in (9), (14), and (15) can be completely cancelled. This cancellation is complete even the frequency difference is large. This cancellation means the cancellation of the MAI.

The cancellation algorithm is explained below.
As shown by (9), (14) and (15):

$$r(t) = \rho_1^2 f^2(u_1(t)) + \rho_2^2 f^2(u_2(t)) + \quad (16)$$
$$2\rho_1\rho_2 f(u_1(t))f(u_2(t))\cos(\omega_1 - \omega_2)t + \ldots +$$
$$\rho_L^2 f^2(u_L(t)) + 2\rho_{L-1}\rho_L f(u_{L-1}(t))f(u_L(t))\cos(\omega_{L-1} - \omega_L)t$$

$$r(t) = \sum_{i=1}^{L} \rho_i^2 f^2(u_i(t)) + \sum_{i=1}^{L-1}\sum_{j=i+1}^{L} 2\rho_i\rho_j f(u_i(t))f(u_j(t))\cos\Delta\omega_{ij}t \quad (17)$$

where $\Delta\omega_{ij}=\omega_i-\omega_j$.

This invention develops a despreading code $C_i(t)$ that detects the signal of the $i^{th}$ user from r(t). We always can refer the desired user as the first user; thus, the despreading for this user is:

$$y(t)=r(t)C_1(t) \quad (18)$$

The $C_1(t)$ ensures that the integration of y(t) for all terms in (16) will be zero except first squared term. The integration found by 213 is:

$$E_1 = \int_0^{T_b} y(t)dt = \int_0^{T_b} r(t)C_1(t)dt = \int_0^{T_b} \rho_1^2 f^2(u_1(t))dt = \pm\rho_1^2 NE_p \quad (19)$$

The despreading code $C_1(t)$ can be constructed by a method given below:

$$C_1(t)=c_1(t)(1-D_0(t)) \quad (20)$$

$$D_0(t) = \begin{cases} \sum_{i=1}^{L/2} D_{2i-1}(t) - \sum_{i=1}^{L/2-1} D_{2i}(t) & L = \text{even number} \\ \sum_{i=1}^{(L-1)/2} D_{2i-1}(t) - \sum_{i=1}^{(L-1)/2} D_{2i}(t) & L = \text{odd number} \end{cases} \quad (21)$$

$$D_j(t) = \sum_{k_1=2}^{L-j+1}\sum_{k_2=k_1+1}^{L-j+2}\ldots\sum_{k_j=k_{j-1}+1}^{L} c_{k_1}(t)c_{k_2}(t)\ldots c_{k_j}(t) \quad (22)$$

$$j = 1, 2, \ldots, L-1;$$

where the number of $\Sigma$ equals to the j.
For example, if L=2, $C_1(t)=c_1(t)(1-c_2(t))$.
If L=3, $C_1(t)=c_1(t)(1-c_2(t)-c_3(t)+c_2(t)c_3(t))$.
If L=4, $C_1(t)=c_1(t)(1-(c_2(t)+c_3(t)+c_4(t)+c_2(t)c_3(t)c_4(t))+(c_2(t)c_3(t)+c_2(t)c_4(t)+c_3(t)c_4(t)))$ . . . etc.

Therefore, the only desired signal is extracted by equations from (18) to (22) and the MAI is completely cancelled using above algorithm. This algorithm can be implemented in the detector of 213 in FIG. 2., 309 in FIG. 3, and 408 in FIG. 4.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims.

We claim:
1. A method to asynchronously demodulate CDMA signal for multiple access applications, comprising:
   a. Coding transmitting signal by selecting special PN codes from all available PN codes,
   b. Coding CDMA signal by bipolar code in a transmitter,
   c. Transmitting carry modulated CDMA bipolar signals at a carry radio frequency that does not have to be exactly the same as different transmitters,
   d. Asynchronous demodulation to remove the carry frequency and convert the bipolar CDMA to on-off CDMA signals in a receiver,
   e. Converting the on-off CDMA signals to polar CDMA signals in the receiver,
   f. Detecting signal from a desired transmitter by despreading the CDMA signals in the receiver and minimizing MAI in a receiver.
2. The method of claim 1 wherein said selecting special PN codes from all available PN codes comprises:
   a. Selecting a PN for a candidate of said special PN codes,
   b. Calculating a product of said candidate code and any PN code of special PN codes,
   c. Comparing said product with any PN code of said special PN codes,
   d. Adding said candidate code to said special PN codes if said product does not match any PN code of said special PN code.

3. The method of claim 1 wherein said asynchronous demodulation removes the carry frequency and converts the bipolar CDMA signals to on-off CDMA signals, said asynchronous demodulation comprises:
   a. Quadrature demodulation for obtaining in-phase and quadrature signals,
   b. Converting said in-phase and quadrature CDMA signals to on-off CDMA signals by taking square,
   c. Obtaining baseband on-off CDMA signals by summing squared in-phase and quadrature signals.

4. The method of claim 1 wherein said asynchronous demodulation removes the carry frequency and converts the bipolar CDMA signals to on-off CDMA signals, said asynchronous demodulation comprises:
   a. Obtaining IF modulated CDMA signals,
   b. Converting the bipolar CDMA signals to on-off CDMA signals by taking square,
   c. Obtain baseband on-off CDMA signals by lowpass filtering.

5. The method of claim 1 wherein said asynchronous demodulation removes the carry frequency and converts the bipolar CDMA signals to on-off CDMA signals, Said asynchronous demodulation comprises:
   a. A bandpass filter to obtain desired CDMA signals in a frequency range,
   d. A squarer to convert the bipolar CDMA signals to on-off CDMA signals,
   e. A lowpass filter to obtain baseband on-off CDMA signals.

6. The method of claim 1 wherein a mean remover converts said on-off CDMA signals to polar signals, and said mean remover comprises:
   a. A mean estimator to estimate mean of said on-off signals,
   b. A subtractor to remove the mean of said on-off signals.

7. The method of claim 1, includes a multi-access interference cancellation (MAI) algorithm to cancel interference from other CDMA transmitters.

8. An apparatus to asynchronously demodulate CDMA for multiple access applications, comprising:
   a. A CDMA coder to code transmitting signal by a special PN code in a transmitter,
   b. A bipolar (pseudoternary) coder to code the polar CDMA signal in said transmitter of a CDMA multiple access communication system,
   c. Multiple transmitters transmit CDMA modulated signals at a carry radio frequency that does not have to be exactly the same as different transmitters,
   d. An asynchronous demodulator removes the carry frequency and convert the bipolar CDMA to on-off CDMA signals,
   e. A mean remover to converts the on-off CDMA signals to polar CDMA signals in the receiver,
   f. A detector to detect signal from a desired transmitter by despreading the CDMA signals in the receiver.

9. The apparatus of claim 8 wherein said CMDA coder codes transmitting signal by a special PN code that does not produce another special code when said special PN code is multiplied with another special PN code.

10. The apparatus of claim 8 wherein said asynchronous demodulator removes the carry frequency and converts the bipolar CDMA signals to on-off CDMA signals, said asynchronous demodulator comprises:
    a. A quadrature demodulator for obtaining in-phase and quadrature signals,
    b. Two squarers to convert the in-phase and quadrature CDMA signals to on-off CDMA signals,
    c. A summer to sum squared in-phase and quadrature signals to obtain baseband on-off CDMA signals.

11. The apparatus of claim 8 wherein said asynchronous demodulator removes the carry frequency and converts the bipolar CDMA signals to on-off CDMA signals, said asynchronous demodulator comprises:
    a. A IF demodulator for obtaining IF modulated CDMA signals,
    b. A squarer to convert the bipolar CDMA signals to on-off CDMA signals,
    c. A lowpass filter to obtain baseband on-off CDMA signals.

12. The apparatus of claim 8 wherein said asynchronous demodulator removes the carry frequency and converts the bipolar CDMA signals to on-off CDMA signals, said asynchronous demodulator comprises:
    a. A bandpass filter to obtain desired CDMA signals in a frequency range,
    d. A squarer to convert the bipolar CDMA signals to on-off CDMA signals,
    e. A lowpass filter to obtain baseband on-off CDMA signals.

13. The apparatus of claim 8 wherein a mean remover converts said on-off CDMA signals to polar signals, and said mean remover comprises:
    a. A mean estimator to estimate mean of said on-off signals,
    b. A subtractor to remove the mean of said on-off signals.

14. The apparatus of claim 8 wherein said detector includes a multi-access interference cancellation (MAI) algorithm to cancel said MAI from other CDMA transmitters.

15. A method to cancel the multi-access interference (MAI) when the number of transmitters is limited, construct a new despreading code for the CDMA despreading for a desired transmitter, method comprises:
    a. Forming all possible products of PN codes of transmitters except the desired transmitter,
    b. Obtained a summed code by summing said products having odd number of said PN codes and subtracting said products having even number of said PN codes,
    c. Obtained said new despreading code by multiplying the PN code of said desired transmitter with the difference between the number one and said summed code.

* * * * *